Figure 1:
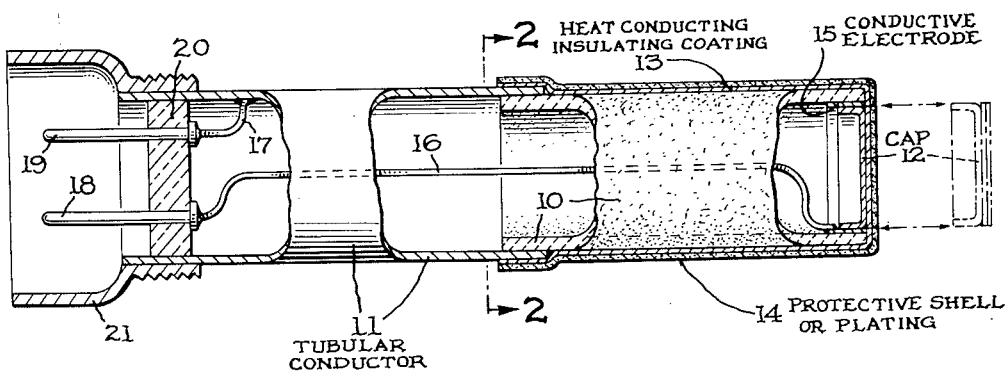

Nov. 22, 1960

E. SION 2,961,625

THERMISTOR PROBE

Filed July 24, 1958

INVENTOR
ELIO SION

BY K.G.Doub
ATTORNEY

United States Patent Office 2,961,625
Patented Nov. 22, 1960

2,961,625
THERMISTOR PROBE

Elio Sion, Los Angeles, Calif., assignor to The Bendix Corporation, a corporation of Delaware Filed July 24, 1958, Ser. No. 750,728

5 Claims. (Cl. 338—28)

Specifications for electric circuitry involving a temperature or thermal function ofttimes call for probes incorporating resistors or semi-conductors having a high negative temperature coefficient of resistance, i.e. as the temperature increases, the resistance of the semi-conductor or resistor decreases. Such resistance elements are commonly known as thermistors; they are of ceramic oxide composition and in many instances take the form of an elongated rod-like shape having electrodes secured to opposite ends thereof. When used in probes it usually becomes necessary to encapsulate the thermistor element in a metallic sheath or cartridge to protect the delicate element against breakage, and in certain installations, to avoid direct contact of the element with the gaseous or fluid material the temperature of which is being sensed. The sheath or housing should be a good heat conductor, and since good heat conductors are usually also good electrical conductors, it becomes necessary to provide sufficient clearance between the walls of the thermistor and sheath to avoid electrical leakage or shorting, with resultant erroneous readings. Thus the thermistor is separated from the medium or area being sensed by a dead air space plus the thickness of the sheath. Such an arrangement results in a lagging temperature response which cannot be tolerated in many types of installations, and it also complicates the attachment of suitable terminals and the effective wiring of the thermistor into the probe circuit.

An object of the instant invention, therefore, is to provide a thermistor-type probe which will reduce the temperature response time to a minimum.

Another object is to provide a probe of the type specified which will present a maximum temperature-responsive area to the medium being sensed for a given mass of thermistor material.

Another object is to provide a thermistor-type probe in which the probe assembly proper may be made as an integral unit with all electric leads taken off one end for convenient insertion into the probe circuit.

Figure 2:
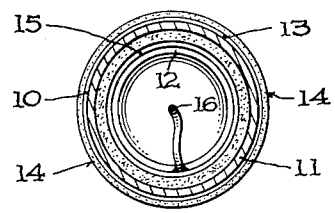

The foregoing and other objects and advantages will become apparent in view of the following description taken in conjunction with the drawing, wherein:

Fig. 1 is a greatly-enlarged view, partly in elevation and partly in broken longitudinal section, of a probe in accordance with the invention, and Fig. 2 is a section taken on the line 2—2, Fig. 1.

Referring to the drawing, a thermistor is indicated at 10; it is preferably of elongated tubular form and may be made of oxidic semi-conducting materials. There are many compositions of such materials and methods of forming same into the desired shape. A typical mix may comprise: ferric oxide, 80% by weight; titanium oxide, 1.5%; zirconium oxide, 2.5%; bentonite, 3.0% and ball clay, 13.0%. These components are mixed while in a dry finely-divided state, then ball-milled with distilled water to form a slurry having a pH value between 5.0 and 7.0, which is press-filtered and pub-milled to proper extrusion consistency. The pugged clay mixture may be extruded through an extrusion die to produce a continuous length of tubular stock, which is then dried to a self-sustaining degree of hardness, whereupon it is severed into individual lengths having the required dimensions.

A tubular thermistor has a number of important advantages when used in temperature-sensing probes. Since response to changes in temperature is inversely proportional to mass, the greater the mass or bulk of material involved, the slower the response. At the same time, the greater the area of thermistor surface presented to the temperature-sensing region, the faster will be the response. A tubular thermistor also facilitates fabrication and assembly of the thermistor to its electrodes and leads as will be more fully hereinafter explained.

A tubular combined electrode and thermistor support is indicated at 11; it may be made of any suitable electrically-conducting material such as brass or copper. In the form shown, it is slightly larger in diameter than the thermistor 10 to enable it to be sleeved or telescoped over one end (herein considered the inner end) of the thermistor. A removable cap or closure member 12 may or may not be fitted into the opposite or outer end of the thermistor, depending upon conditions of usage. Assuming it is desired to leave the inner surface of the thermistor uncoated, then the parts 10, 11 and 12 are immersed, with the capped or closed end down, in a suitable lacquer, resin or varnish, such as G.E. #1202 Glyptal and G.E. #1500 Thinner, mixed in a one-to-one proportion. The assembly is next put into a drying oven maintained at a temperature of from 190 degrees to 220 degrees Fahrenheit and allowed to remain for about three hours; removed and again dipped in the above-noted lacquer or varnish and then put back in the oven and allowed to remain for about five hours. This particular varnish or lacquer treatment provides a heat-conducting electrical-insulating coating, indicated at 13, of about .001 inch thick. Obviously, such coating may be made of varying thicknesses simply by varying the consistency of the material, the number of dipping and drying cycles and by other known methods.

The parts 10 and 11 (also 12 if used) are now ready for application of the outer protective shell or plating indicated at 14. There are a number of methods which may be followed in applying this shell. Thus the parts while still tacky, may be brushed or sprayed with copper or graphite powder and copper plated. If a wear and/or acid-resistant jacket is desired, the parts may be plated with chrome or any other suitable metal or material. In practice, a shell 14 about .002 inch thick has been provided by evaporating copper onto the varnished surfaces of the thermistor 10 and tube 11 in a vacuum evaporator from a distance of approximately three inches for from four to five minutes and then subjecting the copper-coated surfaces to electrolytical action in a copper electrode forming tank for some three and one-half hours at about .25 to .3 ampere.

The protective shell 14 may also be made of varying thicknesses within reason, depending upon conditions to be encountered in service; and it may be endowed with sufficient strength to assist in bonding the tube 11 to the thermistor 10.

In the form shown the thermistor 10 is provided with two electrodes, one at each end, the tube 10 serving as one electrode and an annular conducting ring 15 serving as the other. This ring 15 may consist of a coating of conductive material, such as platinum paste. Other types of conductive coatings may be used, such as powdered metal suspended in a temporary binder which evaporates at a given temperature. Obviously the cap or plug 12 will be removed when the electrode material is applied.

The probe assembly is completed by wire leads 16 and 17, which at their inner ends are suitably secured as by soldering to the electrode 15 and the tube 11, respectively, and at their outer ends are connected to terminals 18, 19, anchored in an insulator 20. The outer end of the tube 11 is fixed in a suitable support such as a probe-mounting member 21, adapted to receive an electrical plug, not shown, by means of which the probe may be connected into an electrical circuit.

A probe of the type herein disclosed has a quick temperature response due to the fact that the encapsulating shell 14 is in direct or intimate contact with the insulating coating 13 and the latter in turn is in direct contact with the thermistor surface, with no intervening dead air spaces. The end cap or plug 12 may be removed or omitted when it is desired to expose the inner surface of the thermistor to the medium being sensed; also, during fabrication and assembly, the inner end of the thermistor is thus rendered accessible to apply the electrode 15 and lead wire 16. While a tubular shaped thermistor and associated electrode holder has important advantages over other shapes, there may be instances where a flat or other shape of probe assembly will better adapt itself to certain types of installations. Also the thermistor and/or holder may be finned to more effectively dissipate heat; the insulating coating and outer plating or shell 14 may be comprised of materials other than those recited by way of example. Thus the insulating coating and shell could be substituted by a relatively thin ceramic coating, overlapping the contiguous end of the holder 11 in the same manner as shown in connection with the plating 14. These and other obvious modifications are contemplated within the scope of the invention as defined by the appended claims.

What I claim is:

1. A temperature-sensing probe comprising probe-mounting means and associated electrical terminals, an elongated hollow electrical conductor fixed at one end to said means, an elongated hollow thermistor fixed at its inner end only in electrical-conducting relation to the other end of said conductor, the latter thus functioning as one of the electrodes for said thermistor, another electrode fixed to and in contact with the outer end portion only of the thermistor so that the resistance path between electrodes is from end-to-end of the thermistor, an electrical lead connected to said second-named electrode and brought out through the hollow interior of the thermistor and conductor to one of said terminals, said electrical lead being out of contact with the inner surface of said thermistor and said conductor, another lead connecting said conductor to another of said terminals, and a protective coating bonded to the exterior surface of said thermistor.

2. A probe as claimed in claim 1 wherein the outer end of said thermistor is provided with a removable closure member.

3. A temperature-sensing probe comprising probe-mounting means and associated electrical terminals, an elongated hollow electrical conductor fixed at one end to said means, an elongated hollow thermistor having its inner end only telescopically engaged with the other end of said conductor, the latter thus functioning as one of the electrodes for said thermistor, another electrode fixed to the outer end of the thermistor, an electrical lead connected to said second-named electrode and brought out through the hollow interior of the thermistor and conductor to one of said terminals, said electrical lead being out of contact with the inner surface of said thermistor and said conductor, another lead connecting said conductor to another of said terminals, a coating of heat-conducting material on the exterior surface of said thermistor, and a protective plating or shell overlying said coating.

4. A temperature-sensing probe comprising probe-mounting means and associated electrical terminals, a tubular electrical conductor secured at its one end to said member, an elongated tubular thermistor having its inner end in telescoping engagement with said conductor and its outer end projecting free, the telescoped end of said conductor functioning as one of the electrodes for said thermistor, another electrode fixed to the outer end of said thermistor, an electrical lead connected to said second-named electrode and brought out through the hollow interior of said thermistor and conductor to one of said terminals, said electrical lead being out of contact with the inner surface of said thermistor and said conductor, another lead connecting the conductor to the other of said terminals, a coating of heat-conducting material such as a lacquer or varnish on the exterior surface of said thermistor, a protective plating or shell of metallic material on said heat-conductive coating, and a closure member removably inserted in the outer end of said thermistor.

5. A temperature-sensing probe comprising a probe-mounting member, electrical terminals fixed in said member, a tubular metallic conductor secured at its one end to said member, an elongated tubular thermistor having its inner end telescoped in the adjacent end of said conductor and its outer end projecting free, the telescoping end of said conductor functioning as one of the electrodes for the thermistor, another electrode fixed to the outer end of said thermistor, an electrical lead connected to said second-named electrode and brought out through the hollow interior of said thermistor and connected to one of said terminals, said electrical lead being out of contact with the inner surface of said thermistor and said conductor, another lead connecting the conductor to the other of said terminals, a coating of heat-conducting material such as lacquer or varnish on the exterior surface of said thermistor, a protective plating or shell of metallic material overlying said heat-conducting coating and overlapping the adjacent end of said conductor, and a closure member removably inserted in the outer end of said tubular thermistor.

References Cited in the file of this patent

UNITED STATES PATENTS

| | | |
|---|---|---|
| 2,120,335 | Lederer | June 14, 1938 |
| 2,120,374 | Ruber | June 14, 1938 |
| 2,149,448 | Lederer et al. | Mar. 7, 1939 |
| 2,271,975 | Hall | Feb. 3, 1942 |
| 2,316,872 | Kernen | Apr. 20, 1943 |
| 2,583,293 | Donna | Jan. 22, 1952 |